F. S. PEABODY.
SWINGING CONVEYER FOR BAND CUTTERS AND FEEDERS OF THRESHERS.
APPLICATION FILED JUNE 3, 1907.
902,537.
Patented Oct. 27, 1908.
2 SHEETS—SHEET 1.
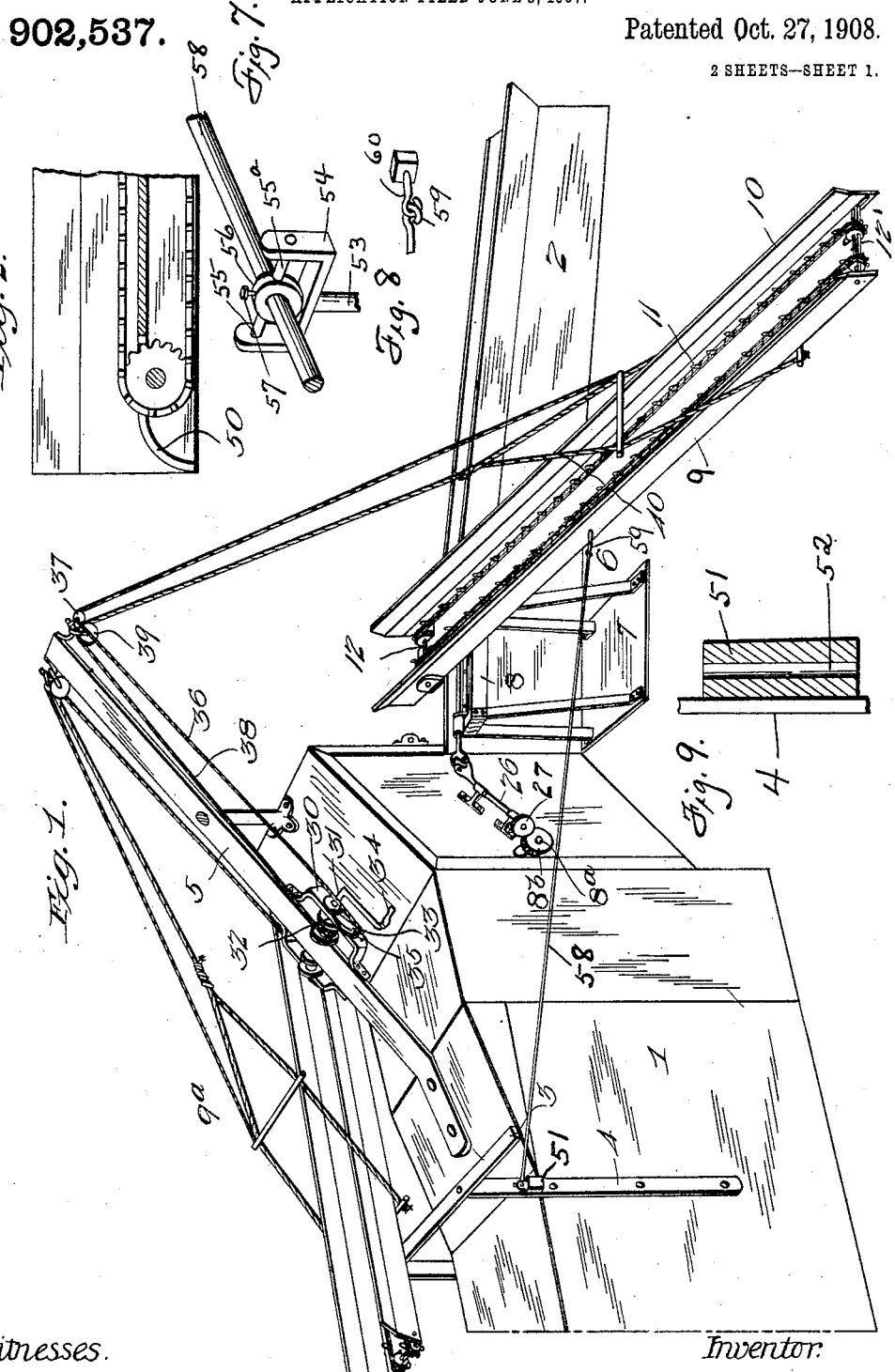

F. S. PEABODY.
SWINGING CONVEYER FOR BAND CUTTERS AND FEEDERS OF THRESHERS.
APPLICATION FILED JUNE 3, 1907.
902,537.
Patented Oct. 27, 1908.
2 SHEETS—SHEET 2.
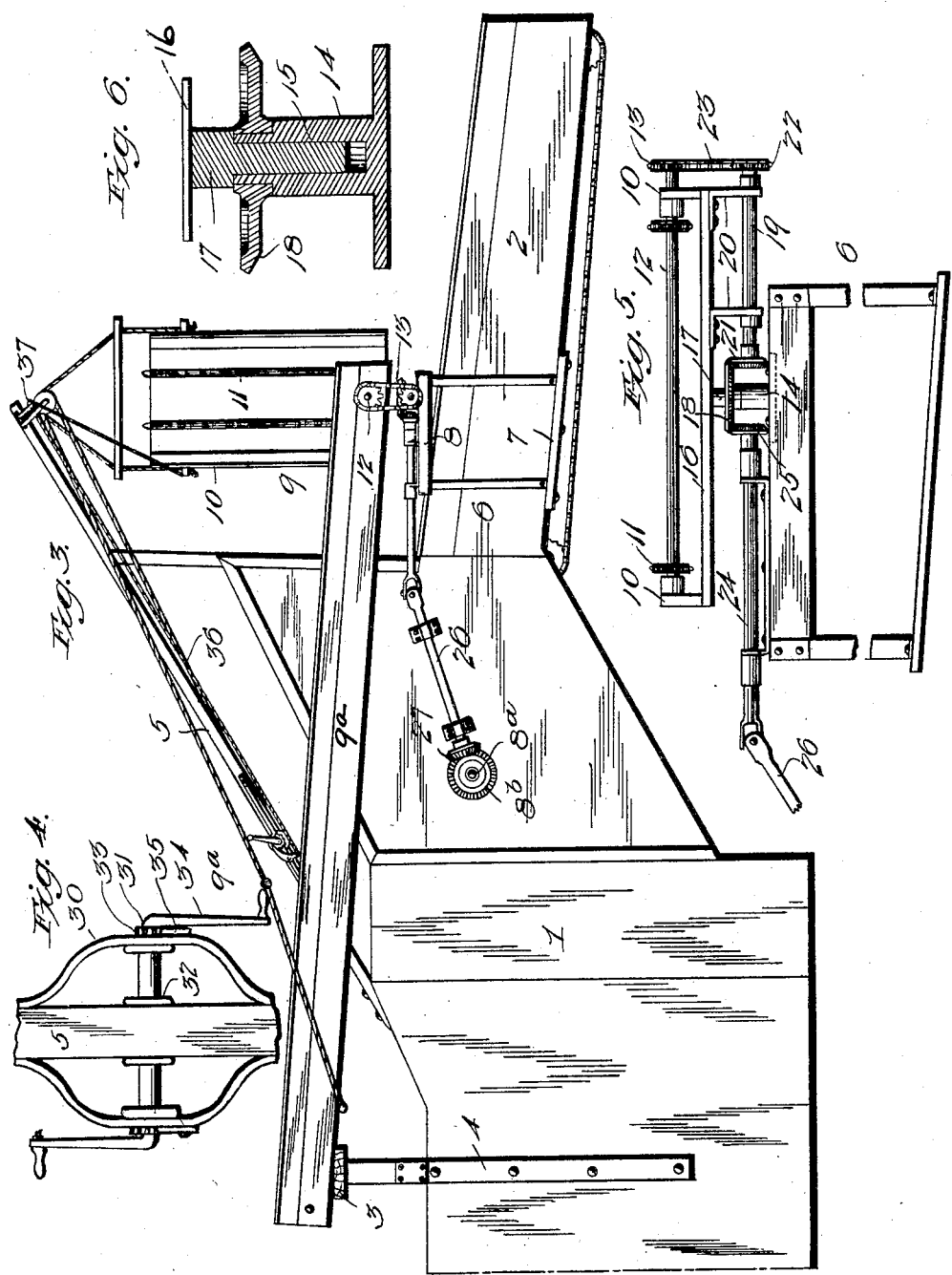
Witnesses.
P. C. Dahlberg.
A. G. Hague
Inventor.
F. S. Peabody.
by Chamberlin & Lane attys

UNITED STATES PATENT OFFICE.

FRED S. PEABODY, OF UTICA, MINNESOTA.

SWINGING CONVEYER FOR BAND-CUTTERS AND FEEDERS OF THRESHERS.

No. 902,537.  Specification of Letters Patent.  Patented Oct. 27, 1908.

Application filed June 3, 1907.  Serial No. 377,027.

*To all whom it may concern:*

Be it known that I, FRED SULLIVAN PEABODY, a citizen of the United States, residing at Utica, in the county of Winona and State of Minnesota, have invented a certain new and useful Improvement in Swinging Conveyers for Band-Cutters and Feeders of Threshers, of which the following is a specification.

My invention relates to conveyers and more particularly to conveyers for supplying bundles of grain to the band cutters and feeders of threshing machines; and it has for one of its objects to provide a duplex conveying apparatus which is possessed of high capacity, is adapted to be adjusted with facility so as to handle grain to the best advantage, is constructed in such manner that either or both of its sections may, when not in operation, be positioned and supported close alongside the threshing machine where they are out of the way and are not liable to be subjected to injury, and is well adapted to withstand the rough usage and exposure to which conveyers for the same purpose are ordinarily subjected.

Another and secondary object of the invention is the provision in a conveying apparatus, of a conveyer mounted to swing horizontally in various planes and vertically in various planes, and this without disturbing the continuity of the driving connection intermediate a driving shaft and the endless belt or belts of the conveyer.

Another object is the provision of means whereby an attendant positioned at a considerable distance from the means through which the conveyers are raised and lowered is enabled to effect the lowering of the conveyers as a stack or other mass of grain is reduced in height.

Other objects attained by my invention will be understood from the following detailed description and appended claims when the same are read in connection with the accompanying drawings, hereby made a part hereof, in which:

Figure 1 is a perspective view illustrating a threshing machine or separator and the band cutter and feeder thereof as equipped with the apparatus constituting the best embodiment of my invention of which I am cognizant. Fig. 2 is an enlarged, detail section of the delivering end of one of the conveyers. Fig. 3 is a side elevation of the same apparatus as in Fig. 1, but with the conveyers in different positions. Fig. 4 is an enlarged detail plan view illustrating the manner in which I mount the drums through which the suspending cables of the conveyers are taken up and let off incident to raising and lowering of the conveyers. Fig. 5 is an enlarged detail elevation showing the mount of one conveyer and the driving connection intermediate a shaft of the threshing machine and the belt or belts of the conveyer. Fig. 6 is an enlarged, diametrical section illustrative of the pivot and the idler gear comprised in said mount and driving connection, and Figs. 7, 8 and 9 are detailed views of the stay rod and its attaching means, the purpose of which is to prevent the troughs from swinging when in use.

Similar numerals designate corresponding parts in all of the views of the drawings, referring to which:

1 is a threshing machine, and 2 is the band cutter and feeder thereof. These elements 1 and 2 may be of the ordinary well known type or of any other construction consonant with the purpose of my invention, in the discretion of the manufacturer, without involving departure from the scope of my invention.

In furtherance of my invention I equip the casing of the threshing machine 1 with a transverse horizontal rest 3 which is fixed on standards 4 and reaches outward beyond the vertical planes of the casing sides, as shown, for a purpose presently set forth; and I also provide the said casing with a fixed arm 5 which extends upward and forward to a point in advance of the forward or receiving end thereof, as illustrated in Figs. 1 and 3. The band cutter and feeder 2, I equip at opposite sides in close proximity to the machine 1 with fixed auxiliary frames 6. These frames comprise platforms 7, and crown bars 8 supported about the proportional distance illustrated above the platforms. But one auxiliary frame 6 is shown, but this will suffice when it is stated that the frames are identical in all respects.

$8^a$ is a shaft journaled in the sides of the threshing machine and having miter gears $8^b$ at its ends located outside the machine casing. The said shaft $8^a$ may be driven from any other shaft or working part of the machine or from any suitable motor and I have therefore deemed it unnecessary to illustrate the means through which it is rotated.

9 indicates one section of my improvements, located at one side of the longitudinal median line of the machine 1 and band cutter and feeder 2, and 9ª indicates the other section, positioned at the opposite side of said line. The said sections 9 and 9ª are identical in all respects save location, and therefore a detailed description of the section 9 will suffice to impart a definite understanding of both. In the said section 9 is comprised a conveyer having a trough 10 and one or more preferably two, carrier belts 11 arranged on shafts 12, 12ª and also arranged to be driven by the said shaft 12 which has a sprocket gear 13 at one end. The trough 10 is pivoted on the shaft 12 and hence is adapted to be swung vertically. Adjacent to the inner end of the trough 10 I provide a pedestal 14, Figs. 5 and 6, fixed on the crown bar 8 of frame 6 and having a vertically-disposed socket 15, horizontally swinging frame 16 in which the shaft 12 is journaled, a pivot pin 17 fixed to the frame 16 and having a shoulder bearing on the upper end of pedestal 14 and also having a reduced portion disposed in the socket 15 of said pedestal, an idler miter-gear 18 loosely mounted on the upper reduced portion of pedestal 14, a shaft 19 journaled in hangers 20 depending from the frame 16 and having a miter-gear 21 at its inner end, intermeshed with the miter-gear 18 and also having a sprocket gear 22 at its outer end, a sprocket belt 23 connecting the sprocket gears 22 and 13, a shaft 24 journaled in suitable bearings on the crown bar 8 of frame 6 and having a miter-gear 25 at its inner end, intermeshed with the miter gear 18, a shaft 26 journaled in suitable bearings on the machine 1 and connected through a universal joint with the shaft 24, and a miter gear 27 fixed on the shaft 26 and intermeshed with the miter gear 8ᵇ.

It will be apparent from the foregoing that the trough and belts of the conveyer may be swung vertically or raised and lowered independent of the frame 16 and may be swung horizontally with the said frame 16, and this without affecting the driving connection between the shaft 8ª and the belts 11. Carried by the fixed arm 5 is a bracket 30 fixed to one side of the arm, a shaft 31 journaled in said bracket and arm and provided with a drum 32, a ratchet 33 and a crank 34, and a lever pawl 35 fulcrumed on the bracket and having one of its arms arranged to engage the ratchet 33. A cable 36 is connected to the other arm of pawl 35 and passed over a sheave 37 hanging on the upper end of the fixed arm 5 and carried out to a point adjacent to the outer end of the conveyer, and a cable 38 is connected to and designed to be wound on the drum 32, and passed over a sheave 39 hung from the upper end of arm 5, and connected through a loop 40 or other suitable means with the outer portion of the conveyer.

It will be manifest from the foregoing that when not in use, the conveyers of my improvements may be positioned on the rest 3 close against the sides of the machine casing when they will be out of the way and will not be likely to be injured; and it will also be manifest that the conveyers may be swung horizontally off and on said rest as well as to and from the point from which it is desired to convey bundles of grain to the band cutter and feeder. It will further be noted that the conveyers are susceptible of being swung vertically, and that they may be conveniently raised by turning the cranks 34 to suit them to the height of the stacks from which grain is to be taken. To effect the lowering of the conveyers, the pawls 35 must be disengaged from the ratchets 33, and this may be accomplished by an attendant standing on or adjacent to the stacks from which grain is to be taken. The attendant disengages the pawls 35 from the ratchets 33 by drawing on the cables 36, and this will be appreciated as an important advantage when it is noted that the attendants standing on or adjacent to the stacks are enabled to expeditiously and easily lower the conveyers as the stacks are decreased in height, and that subsequent to each lowering of the conveyers, said attendant is enabled by slackening the cables 36 to reëstablish the engagement of the pawls 35 with the ratchets 33 and thereby adjustably hold the conveyers in their new positions.

As shown in Fig. 2, each of the conveyers is provided with an extension of the bottom 50 over which the bundles pass, and through which the chains run. This prevents engagement of the bundle with the chain after delivery to the self feeder proper.

In Fig. 1 I have shown one of the stay rods used for preventing the trough 9 from swinging when in use. The details of this rod and its attaching means are shown in Figs. 7, 8 and 9. Referring to Figs. 1 and 9, it will be seen that standard 4 is provided with a block or casting 51, said block or casting being located at a point between the top of the separator and the top of the standard, and an opening 52 extends lengthwise through said casting which forms a seat for the stem 53 of a yoke 54 (see Fig. 7). Said yoke comprises a horizontal base from which the stem extends, and two vertically extending arms, the upper portions of which are each provided with bearing for the reception of shafts 55 and 55ª, said shafts being connected together by means of an enlarged eye 56. 57 designates a thumb screw that passes through the upper portion of said eye 56. 58 designates the stay rod, the outer end of which is provided with a hook 59. 60 designates an eye bolt that is carried by the trough 10. In connecting up this stay rod, it is first passed through the eye 56, and its hook end 59 is engaged with the eye bolt 60 of the trough.

The thumb screw 57 is then screwed until it engages with the rod 58, thus binding said rod within the eye 56. By means of the yoke having its stem within the opening of block or casting 51, said yoke is capable of being horizontally rotated, and by reason of the eye 56 being journaled within the arms of the yoke 54, said eye is also rotatable, and it will therefore be seen that the stay rod 58 by means of its connection with the eye 56, has a swiveled connection with the standard 4, and also that the hook 59, which engages with the eye bolt 60 has a swiveled connection with the trough 10. It is apparent therefore that by these swiveled connections it is possible to swing the trough to various operative positions, without disengaging said rod. When the trough is not in use, the yoke is lifted from the block or casting, and it together with the attached rod is swung over onto the trough.

Although I have shown and described but one rod and its appurtenances in connection with trough 10 and the machine, a similar rod construction is employed for operating the trough 10 located on the opposite side of the machine, and hence a description thereof is deemed unnecessary in view of the duplication of parts involved.

As before stated the construction herein shown and described constitutes the best embodiment of my invention known to me, but I do not desire to be understood as confining myself to the specific construction and relative arrangement of parts as it is obvious that in practice such changes or modifications may be made as fairly fall within the scope of my invention in the claims appended.

I claim:

1. In a conveying apparatus, the combination of a support, a conveyer connected thereto, a second conveyer arranged at one side of the first mentioned conveyer and mounted to swing vertically, a cable passed over a sheave on the support and connected with the second mentioned conveyer, means on the support for adjusting the cable, means on the support for holding the first mentioned means against retrograde movement, and a second cable passed over a sheave on the support and connected with the second mentioned means.

2. In a conveying apparatus, the combination of a support, a conveyer connected thereto, a second conveyer arranged at one side of the first mentioned conveyer and mounted to swing vertically, a cable passed over a sheave on the support and connected with the second mentioned conveyer, a drum mounted on the support and equipped with a ratchet; a crank connected to said cable, a lever pawl engaging the ratchet, and a second cable connected to the lever pawl and passed over a sheave on the support.

3. In a conveying apparatus, the combination of a support, a conveyer mounted to swing both laterally and vertically, a stay rod connected with the conveyer, and a universal coupling between said stay rod and the support.

4. In a conveying apparatus, the combination of a support, a conveyer mounted to swing both laterally and vertically, a stay rod connected with the conveyer, and a universal coupling between said stay rod and the support; said coupling being adjustably fixed to the stay rod.

5. In a conveying apparatus, the combination of a support, a conveyer mounted to swing both laterally and vertically, a stay rod connected with the conveyer, and a universal coupling between said stay rod and the support; said coupling having a ring receiving the stay rod and also having a set screw bearing in the ring and engaging the rod.

6. In a conveying apparatus, the combination of a support, a conveyer fixed with respect thereto, vertically and laterally movable conveyers arranged at opposite sides of the fixed conveyer and having their inner ends positioned to discharge into said fixed conveyer, and devices mounted on the support and connected with the laterally and vertically movable conveyers for raising the latter.

7. In a conveying apparatus, the combination of a support, a conveyer fixed with respect thereto, vertically and laterally movable conveyers arranged at opposite sides of the fixed conveyer and having their inner ends positioned to discharge into said fixed conveyer, cables passed over sheaves on the support and connected with the movable conveyers, means on the support for adjusting the cables, means on the support for holding the first mentioned means against retrograde movement, and other cables passed over sheaves on the support and connected with the second mentioned means.

8. In a conveying apparatus, the combination of a support, a conveyer fixed with respect thereto, vertically and laterally movable conveyers arranged at opposite sides of the fixed conveyer and having their inner ends positioned to discharge into said fixed conveyer, devices mounted on the support and connected with the laterally and vertically movable conveyers for raising the latter, and stay rods interposed between the movable conveyers and the support and arranged to be accommodated to varying distances between the movable conveyers and the support and also arranged to conform to vertical movements of the former.

FRED S. PEABODY.

Witnesses:
ROBERT D. LOUDON,
ROBT. W. KING.